United States Patent [19]

Kazlas et al.

[11] Patent Number: 5,312,635
[45] Date of Patent: May 17, 1994

[54] METHOD OF MAKING REDUCED OIL CONTENT FRIED FOOD PRODUCTS

[75] Inventors: Peter T. Kazlas, Allentown; Richard A. Novak, Lansdale; Raymond J. Robey, Macungie; Richard E. Wildasin, Allentown, all of Pa.

[73] Assignee: Liquid Carbonic Corporation, Oak Brook, Ill.

[21] Appl. No.: 991,760

[22] Filed: Dec. 17, 1992

Related U.S. Application Data

[63] Continuation of Ser. No. 729,613, Jul. 15, 1991, abandoned, which is a continuation-in-part of Ser. No. 571,748, Aug. 23, 1990, abandoned.

[51] Int. Cl.$^5$ .......................... A23L 1/217; C11B 3/00
[52] U.S. Cl. ................................. 426/417; 426/425; 426/438; 554/175
[58] Field of Search ............... 426/417, 425, 438, 441; 554/175, 205

[56] References Cited

U.S. PATENT DOCUMENTS

| | | | |
|---|---|---|---|
| 4,280,961 | 7/1981 | Schneider et al. | 260/412.8 |
| 4,466,923 | 8/1984 | Friedrich | 260/412.8 X |
| 4,493,854 | 1/1985 | Friedrich et al. | 426/417 X |
| 4,721,425 | 1/1988 | Lee et al. | 426/438 |
| 4,749,522 | 6/1988 | Kamarei | 260/412.8 |
| 4,816,274 | 3/1989 | Baisden | 426/417 |
| 5,026,565 | 6/1991 | McLachlan et al. | 426/417 X |

OTHER PUBLICATIONS

Hannigan, "Extraction Process Coats Low Fat Potato Chips", Food Engineering, Jul. 1981, p. 77.

Primary Examiner—Arthur L. Corbin
Attorney, Agent, or Firm—Fitch, Even, Tabin & Flannery

[57] ABSTRACT

A method of making reduced oil content food chip products, such as potato chips and corn chips, includes circulating liquid carbon dioxide, over the food chip products to extract oil. Reduction of oil content to less than 50% of its initial value, including reductions to 25%, may be achieved while retaining flavor and texture comparable to conventional deep fried chips having an oil content of 30% to 40%. The oil which is recovered from the liquid carbon dioxide used for extraction has an appearance and quality which are substantially the same as virgin frying oil and may be reused to deep fry chips.

13 Claims, No Drawings

METHOD OF MAKING REDUCED OIL CONTENT FRIED FOOD PRODUCTS

This application is a continuation of application Ser. No. 729,613 filed Jul. 15, 1991, now abandoned, which is a continuation-in-part of U.S. Ser. No. 571,748, filed Aug. 23, 1990, now abandoned.

BACKGROUND OF THE INVENTION

This invention relates to low oil content food products, such as corn chips and potato chips. More particularly, this invention relates to a process for removing oil from fried chip products by extraction with liquid carbon dioxide. Still more particularly, this invention relates to a process for removing more than 50%, preferably about 75%, of the oil from fried chips by extraction with liquid carbon dioxide. Even more particularly, this invention relates to a process of making fried chip products including deep frying chips in oil, extracting oil from the fried chips to produced reduced oil content fried chips, and recovering the extracted oil for further use, such as reuse in the frying process. This invention also relates to low oil content fried chips produced by the foregoing methods.

Chip food products such as potato chips and corn chips are typically produced by deep frying in oil. While such preparation yields chips which are highly desirable in terms of flavor and texture, it also yields chips with an oil content of about 30% to about 40% by weight. Such a large oil content is frequently viewed as unhealthy, and there has arisen a demand for chips having a reduced oil content. Attempts to produce such chips have encountered difficulty in achieving both a substantial reduction in oil content and acceptable flavor and texture. Accordingly, low oil chips presently marketed have only about 25%-33% reduction in oil content.

Until the present invention, two techniques have been employed to produce potato chips with a low oil content. The first technique employs the use of an alternative cooking process to conventional deep fat frying. As an example, partially cooked and processed potatoes can be mashed, extruded or otherwise formed into chip shaped articles, lightly sprayed with a vegetable or animal based oil, and then roasted in hot air to complete the cooking process. These products have a reduced oil content compared to potato chips deep fried in oils. However, these products do not have the appearance, texture or flavor of fried potato chips.

The second technique for producing a low-oil potato or corn chip is to deep fry sliced potatoes or corn chips in vegetable or animal base oils and subsequently remove some fraction of the oil from the fried chip. At least two process schemes are known for removing the oil from the fried chip. In the first scheme, a combination of heat, and/or sweeping with an inert gas or liquid, and/or a partial vacuum is used to remove some fraction of the oil from the fried chip. This process reportedly is limited to oil reductions of 33% by weight. Further reductions result in chips with unacceptable texture and flavor characteristics.

The second process scheme to remove oil from fried chips involves the use of supercritical carbon dioxide to remove some fraction of the oil from the fried chip. For instance, as disclosed in Hannigan, "Extraction Process Creates Low-Fat Potato Chips", Food Engineering, July, 1981, fried potato chips are placed in a "short and fat" processing vessel through which is passed a stream of supercritical carbon dioxide. Fats and oils dissolve into the carbon dioxide which is then routed to a separator for cleaning and recycling. According to the Hannigan article, only up to 50% of the fat can be removed while still producing potato chips with texture and flavor characteristics that are similar to the original product.

It is believed that supercritical carbon dioxide extraction of oil from fried potato chips, as proposed in the Hannigan article, has never been commercially practiced. It is believed that the reason for this is that the supercritical carbon dioxide oil extraction process has been found to be uneconomical on a commercial scale.

It is therefore a general object of the invention to provide a method of producing low oil content food chip products.

It is a further object of the invention to provide low oil content food chip products having flavor and textures comparable to convention deep fried chip products.

It is a further object of the invention to provide a method for making low oil content food chip products which may be used with conventional deep frying techniques.

It is a further object of the invention to provide a method for making low oil content food chip products having an oil content of less than 50%, desirably on the order of 25%, of the oil content of conventional deep fried chip products.

It is a further object of the invention to provide a method of making low oil content food chip products which may be economically utilized on a commercial scale.

SUMMARY OF THE INVENTION

In accordance with the foregoing objects, the method of the present invention comprises oil extraction with liquid carbon dioxide to produce low oil content fried chip products. By suitable choice of extraction parameters, oil removal in almost any desired quantity may be achieved, including removal in excess of 50% of the oil present in deep fried food chip products. In a particularly preferred embodiment, the method of the invention includes recovery of the oil removed during the extraction process for further use, such as for deep frying food products, whereby the process may be economically practiced on a commercial scale.

These and other objects and features of the invention will become apparent upon a review of the following specification and claims.

DETAILED DESCRIPTION OF THE INVENTION

The critical temperature for carbon dioxide is 31° C. and the critical pressure is 1070.16 psia. At temperatures and pressures above the critical temperature and critical pressure, supercritical carbon dioxide is formed. Supercritical carbon dioxide is neither liquid nor vapor but combines some of the solvent and transport properties of each. Supercritical carbon dioxide has densities and other properties which are more like a gas than a liquid. As indicated, it is known to remove up to 50% of the fat of potato chips by contacting the potato chips with supercritical carbon dioxide, as reported in the Hannigan article. The Hannigan article further indicates that supercritical fluids can dissolve significant amounts of oil at rates of extraction higher than conventional liquid solvents.

It has been determined, however, that the use of supercritical carbon dioxide to extract more than 50% of the oil from potato chips, results in extraction of a considerable amount of potato flavor components. The final potato chip product has a low oil level, but lacks the flavor characteristics that are associated with the original high oil product.

In accordance with the present invention, it has been determined that liquid carbon dioxide can be used to extract more than 50% of the oil from potato chips and other high oil snack foods without extracting a substantial amount of flavor components and produces a low oil extracted product with the texture and flavor associated with the original high oil product.

Carbon dioxide can be liquified at any temperature between the triple point temperature of $-56.6°$ C. and the critical point temperature of $31°$ C. by compressing the carbon dioxide to the liquification temperature. In the method of the present invention, it is preferred to use liquid carbon dioxide that is at ambient temperatures, or below. This is typically from about $0°$ C. to about $30°$ C., which corresponds to a liquification pressure of 505.4 psia and 1045.8 psia, respectively. It should be understood that supercritical carbon dioxide cannot be provided at temperatures below the critical temperature of $31°$ C. The use of liquid carbon dioxide is completely distinguishable from the use of supercritical carbon dioxide as an extraction media.

According to one aspect of the present invention, deep fried food chip products, typically having an oil content of between about 30% and about 40% are subjected to liquid carbon dioxide extraction in a process which removes in excess of 50% of the oil content. In an important embodiment of the invention, chips which have been deep fried in oil are placed into an extraction vessel and subjected to a flow of liquid carbon dioxide. The liquid carbon dioxide has a temperature which is preferably between about $0°$ C. and about $30°$ C., and most preferably between about $20°$ C. and about $30°$ C. The liquid carbon dioxide has a pressure which is above the liquification pressure and is preferably between about the liquification pressure and about 4,500 psig.

During the extraction process, oil from the chips is dissolved in the liquid carbon dioxide. Liquid carbon dioxide bearing dissolved oil is then withdrawn from the extraction vessel and conducted to a separation vessel, where the pressure and/or temperature are controlled so that the carbon dioxide is vaporized and the oil dissolved in the carbon dioxide is separated from the carbon dioxide. The resulting substantially oil-free carbon dioxide may then be recycled for further use in the extraction process.

It has been discovered that with the use of the foregoing process, virtually any desired chip oil content may be achieved, including reductions in oil content in excess of 50%. In particular, the oil content of commercially available potato chip and corn chip products, typically initially about 30% to 40% by weight, can be reduced to about 25% of that value, i.e., from about 7.5% to about 10% by weight, while still retaining desirable flavor and texture.

It has been further discovered that the oil which is separated from the carbon dioxide in the separator is comparable, to virgin frying oil in appearance and performance. Therefore, in accordance with a second aspect of the invention, oil extracted from chips during the preparation of reduced oil content chip products is recovered for reuse, preferably to be reused as frying oil for deep frying chip products. The recovery of extracted oil for further use provides a substantial economic benefit.

The degree of oil extraction by the process of the present invention can be easily controlled by controlling the carbon dioxide flow rate and the extraction time. These parameters may be chosen based upon the initial oil content of the chips, the desired oil content of the low oil chips, and the nature of the chip products themselves. For instance, corn chips are thicker and have a smaller surface area to volume ratio than potato chips, and accordingly require increased extraction time to obtain a given degree of oil removal, all other parameters of the process being equal.

It has been determined that liquid carbon dioxide to high oil food product ratios of between about 5:1 and about 100:1 are suitable when extracting oil from potato chips or corn chips, depending upon the level of oil reduction desired.

EXAMPLES

The following examples further illustrate various features of the present invention, but are intended to in no way limit the scope of the invention as set forth in the claims.

EXAMPLE 1

5 pounds of commercially produced potato chips were loaded into an extractor basket. The chips contained about 37% oil by weight. The basket containing the chips was placed into a 50 liter high pressure extraction vessel and the vessel was sealed. The extraction system was purged for about 5 minutes with low pressure carbon dioxide gas to expel air. The extraction system, also including a 10 liter separation vessel, is associated with a high pressure pump, heat exchangers and utility supplies, was heated and pressurized with liquid carbon dioxide and brought to the desired operating conditions, namely, an extraction vessel pressure of 1523 psig, an extraction vessel temperature of $19.3°$ C., a separation vessel pressure of 740 psig, and a separation vessel temperature of $15°$ C. The liquid carbon dioxide was continuously cycled through the bed of potato chips in the extraction vessel at a flow rate of 143 pounds per hour, than passed through the separation vessel where the liquid carbon dioxide was vaporized to a gas and the oil was separated from the carbon dioxide. The gaseous carbon dioxide was recompressed to a liquid and returned to the extractor as required. At the conclusion of an extraction period of 2 hours, the flow of carbon dioxide was stopped and the system was depressurized to atmospheric pressure. The extraction vessel was opened and the basket containing the chips was removed from the vessel. The oil removed from the chips was recovered by draining it from the separation vessel.

With the above process, 66.7% of the oil initially present in the potato chips was removed from the chips and recovered to provide a potato chip product with 16.3% oil. The low oil potato chips produced by the process suffered no detrimental change in flavor, texture or quality. The recovered oil was of high quality and identical in appearance to virgin frying oil.

EXAMPLE 2

7 pounds of commercially produced corn chips, containing about 36.1% oil by weight, were loaded into an extractor basket, loaded into the apparatus described above with respect to Example 1, and the system brought to the same extraction and separation pressures and temperatures specified above with respect to Example 1. The liquid carbon dioxide was cycled through the bed or corn chips at a solvent flow rate of 138 pounds per hour. At the conclusion of an extraction period of 3.6 hours, the flow of carbon dioxide was stopped and the system depressurized to atmospheric pressure. As in Example 1, the extraction vessel was opened and the basket containing the chips removed from the vessel. The oil removed from the chips was recovered by draining it from the separation vessel.

Using the above process, 75% of the oil initially present in the corn chips was removed from the chips and recovered. The low oil corn chips produced by the process suffered no detrimental change in flavor, texture or quality. The recovered oil was of high quality and identical in appearance to virgin frying oil.

As is seen particularly with the foregoing examples, the process of the invention is highly effective in producing reduced oil content potato and corn chips, which retain desirable flavor and texture characteristics, and that reuse of the extracted oil provides substantial economic advantages. The process of the invention may be used to extract oil from other chip products, other snack foods, or other types of oil-containing food products. Other variations will no doubt occur to those skilled in the art without departing from the spirit and scope of the invention.

What is claimed is:

1. A method of reducing the oil content of oil-containing deep-fried food products comprising the steps of:
    (a) placing the food products into an extraction vessel;
    (b) contacting the food products in the extraction vessel with liquid carbon dioxide at a temperature of from about 0° C. to about 30° C. and at a pressure between the liquid carbon dioxide liquefaction pressure and about 4500 psig to effect extraction of at least 50% of the oil from the food products into the liquid carbon dioxide; and
    (c) withdrawing liquid carbon dioxide containing extracted oil from the extraction vessel.

2. A method according to claim 1 wherein said food products are potato chips.

3. A method according to claim 1 wherein said food products are corn chips.

4. A method according to claim 1 wherein said food products are chips having an oil content by weight of between about 30% and about 40% prior to extraction of oil therefrom.

5. A method according to claim 1 wherein said liquid carbon dioxide is at a temperature in said extraction vessel between about 20° C. and about 30° C. and a pressure above the liquification pressure.

6. A method according to claim 1 wherein said liquid carbon dioxide to oil-containing food product is between about 5:1 and about 100:1.

7. A method of making reduced oil content potato chips or corn chips from an uncooked chip product comprising the steps of:
    (a) deep frying said chip product in oil to produce a fried chip product;
    (b) circulating liquid carbon dioxide at a temperature of from about 0° C. to about 30° C. and at a pressure above the liquid carbon dioxide liquefaction pressure up to about 4500 psig, over said fried chip product to extract oil from said fried chip product into said liquid carbon dioxide until the oil content of said fried chip product has been reduced to a predetermined level of less than about 50% by weight of the initial oil content of said fried chip product to produce reduced oil content potato chips or corn chips; and
    (c) separating oil extracted in step (b) from said liquid carbon dioxide.

8. A method according to claim 7 wherein said fried chip product has an oil content by weight of between about 30% and about 40%.

9. A method according to claim 7 wherein said predetermined oil content level is less than about 25% by weight of the initial oil content of said fried chip product.

10. A method according to claim 7 wherein said predetermined oil content level is less than about 17% by weight of the initial oil content of said fried chip product.

11. A method according to claim 7 wherein said predetermined oil content level is between about 5% and about 10% by weight of the initial oil content of said fried chip product.

12. A method according to claim 7 wherein said liquid carbon dioxide has a temperature in said extraction vessel of between about 20° C. and about 30° C. and is at a pressure above the liquification pressure.

13. A method according to claim 7 wherein said circulating step (b) is performed with a liquid carbon dioxide to fried chip product ratio of between about 5:1 and about 100:1.

* * * * *